(12) United States Patent
Bohlig et al.

(10) Patent No.: US 7,757,863 B2
(45) Date of Patent: Jul. 20, 2010

(54) SYSTEMS AND METHODS FOR GLASS RECYCLING AT A BENEFICIATOR AND/OR A MATERIAL RECOVERY FACILITY

(75) Inventors: James W. Bohlig, Cuttingsville, VT (US); Sean P. Duffy, Huntersville, NC (US)

(73) Assignee: Casella Waste Systems, Inc., Rutland, VT (US)

( * ) Notice: Subject to any disclaimer, the term of this patent is extended or adjusted under 35 U.S.C. 154(b) by 952 days.

(21) Appl. No.: 11/135,291

(22) Filed: May 24, 2005

(65) Prior Publication Data

US 2006/0000237 A1   Jan. 5, 2006

Related U.S. Application Data

(63) Continuation-in-part of application No. 10/989,425, filed on Nov. 17, 2004.

(60) Provisional application No. 60/534,688, filed on Jan. 8, 2004, provisional application No. 60/520,311, filed on Nov. 17, 2003.

(51) Int. Cl.
*B07B 9/00* (2006.01)
(52) U.S. Cl. .............................. 209/37; 209/30; 209/21; 209/44.4; 209/937
(58) Field of Classification Search ................ 209/21, 209/30–37, 44.4, 937
See application file for complete search history.

(56) References Cited

U.S. PATENT DOCUMENTS

| | | | |
|---|---|---|---|
| 3,003,886 A | 10/1961 | Pither | |
| 3,790,091 A | 2/1974 | Law et al. | |
| 3,802,558 A * | 4/1974 | Rhys | 209/557 |
| 3,804,249 A | 4/1974 | Gibbons et al. | |
| 3,848,813 A | 11/1974 | Stanczyk et al. | |
| 3,907,670 A | 9/1975 | Fernandes | |
| 3,922,975 A | 12/1975 | Reese | |
| 4,044,695 A | 8/1977 | Mackenzie et al. | |
| 4,069,145 A | 1/1978 | Sommer, Jr. et al. | |
| 4,070,273 A | 1/1978 | Morey | |
| 4,072,273 A | 2/1978 | Reiniger | |
| 4,201,551 A | 5/1980 | Lyshkow et al. | |

(Continued)

FOREIGN PATENT DOCUMENTS

DE   19953208   5/2000

(Continued)

OTHER PUBLICATIONS

Form PCT/ISA/220: Notification of Transmittal of the International Search Report and the Written Opinion.

(Continued)

*Primary Examiner*—Patrick H Mackey
*Assistant Examiner*—Terrell H Matthews
(74) *Attorney, Agent, or Firm*—Wilmer Cutler Pickering Hale and Dorr LLP

(57) ABSTRACT

Embodiments of the present invention provide systems and methods for obtaining recycled mixed cullet at a beneficiator and/or a material recovery facility (MRF). The composition of the cullet, or portions thereof, can be certified for use by a party other than the beneficiator and/or the MRF. The recycled mixed cullet can be used, for example, by glass plants to make new glass articles, such as beverage bottles.

8 Claims, 2 Drawing Sheets

U.S. PATENT DOCUMENTS

| | | |
|---|---|---|
| 4,204,906 A | 5/1980 | Liu |
| 4,245,999 A | 1/1981 | Reiniger |
| 4,265,636 A | 5/1981 | Frankiewicz |
| 4,297,322 A | 10/1981 | Liu |
| 4,341,353 A | 7/1982 | Hamilton et al. |
| 4,353,713 A | 10/1982 | Cheng |
| 4,387,019 A | 6/1983 | Dale et al. |
| 4,399,029 A | 8/1983 | Clin et al. |
| 4,457,772 A | 7/1984 | Haynes et al. |
| 4,533,053 A | 8/1985 | Kenny et al. |
| 4,553,977 A | 11/1985 | Fry |
| 4,597,487 A * | 7/1986 | Crosby et al. ............... 194/209 |
| 4,678,860 A | 7/1987 | Kuester |
| 4,778,116 A | 10/1988 | Mayberry |
| 4,832,204 A | 5/1989 | Handy et al. |
| 4,844,351 A | 7/1989 | Holloway |
| 4,874,134 A | 10/1989 | Wiens |
| 5,009,370 A | 4/1991 | Mackenzie |
| 5,014,996 A | 5/1991 | von Braunhut |
| 5,048,694 A | 9/1991 | Iwamoto et al. |
| 5,071,075 A | 12/1991 | Wiens |
| 5,091,077 A | 2/1992 | Williams |
| 5,104,047 A | 4/1992 | Simmons |
| 5,104,419 A | 4/1992 | Funk |
| 5,150,307 A | 9/1992 | McCourt et al. |
| 5,184,780 A | 2/1993 | Wiens |
| 5,234,109 A | 8/1993 | Pederson |
| 5,250,100 A | 10/1993 | Armbristor |
| 5,263,591 A | 11/1993 | Taormina et al. |
| 5,278,282 A | 1/1994 | Nauman et al. |
| 5,299,693 A | 4/1994 | Ubaldi et al. |
| 5,314,071 A * | 5/1994 | Christian et al. ............... 209/4 |
| 5,333,797 A | 8/1994 | Becker et al. |
| 5,333,886 A | 8/1994 | Sanders |
| 5,344,025 A * | 9/1994 | Tyler et al. .................... 209/35 |
| 5,356,082 A | 10/1994 | Prinz et al. |
| 5,366,093 A | 11/1994 | Huber |
| 5,370,234 A | 12/1994 | Sommer, Jr. et al. |
| 5,419,438 A | 5/1995 | Squyres et al. |
| 5,443,157 A | 8/1995 | Baker et al. |
| 5,461,136 A | 10/1995 | Krutak et al. |
| 5,464,100 A | 11/1995 | Oka |
| 5,465,847 A * | 11/1995 | Gilmore .................... 209/12.1 |
| 5,470,918 A | 11/1995 | Tsutumi et al. |
| 5,485,925 A | 1/1996 | Miller et al. |
| 5,503,788 A | 4/1996 | Lazareck et al. |
| 5,547,134 A | 8/1996 | Rubenstein |
| 5,555,984 A | 9/1996 | Sommer, Jr. et al. |
| 5,588,598 A | 12/1996 | Becker et al. |
| 5,611,493 A | 3/1997 | Hayashi et al. |
| 5,638,959 A | 6/1997 | Sommer, Jr. et al. |
| 5,667,079 A * | 9/1997 | Jongebloed ................ 209/589 |
| 5,675,416 A | 10/1997 | Campbell et al. |
| 5,718,737 A | 2/1998 | Mosch |
| 5,740,918 A | 4/1998 | Hayashi et al. |
| 5,794,788 A * | 8/1998 | Massen ..................... 209/524 |
| 5,890,663 A | 4/1999 | Strach et al. |
| 5,902,976 A | 5/1999 | Beasley |
| 5,922,090 A | 7/1999 | Fujimura et al. |
| 5,971,162 A | 10/1999 | Allagnat et al. |
| 5,988,395 A | 11/1999 | Calo et al. |
| 6,000,639 A | 12/1999 | Ganguli |
| 6,124,560 A | 9/2000 | Roos et al. |
| 6,144,004 A | 11/2000 | Doak |
| 6,144,044 A | 11/2000 | Yoshinaga et al. |
| 6,152,306 A | 11/2000 | Miller |
| 6,168,102 B1 | 1/2001 | Bergart |
| 6,230,521 B1 | 5/2001 | Lehman |
| 6,264,038 B1 | 7/2001 | Schmidt |
| 6,401,936 B1 | 6/2002 | Isaacs et al. |
| 6,423,878 B2 | 7/2002 | Reverso |
| 6,446,813 B1 | 9/2002 | White |
| 6,464,082 B1 * | 10/2002 | Kimmel et al. ............ 209/12.1 |
| 6,467,708 B1 | 10/2002 | Terzini et al. |
| 6,484,886 B1 | 11/2002 | Isaacs et al. |
| 6,578,783 B2 | 6/2003 | Simon et al. |
| 6,763,280 B1 | 7/2004 | Lehman |
| 6,902,065 B2 | 6/2005 | Kimura et al. |
| 6,945,484 B1 | 9/2005 | Terzini et al. |
| 6,974,097 B2 | 12/2005 | Simon et al. |
| 7,188,730 B2 | 3/2007 | Centers et al. |
| 7,252,691 B2 | 8/2007 | Philipson et al. |
| 7,264,124 B2 | 9/2007 | Bohlig et al. |
| 7,302,407 B2 | 11/2007 | Bohlig et al. |
| 7,341,156 B2 | 3/2008 | Bohlig et al. |
| 7,351,929 B2 | 4/2008 | Afsari et al. |
| 7,355,140 B1 | 4/2008 | Afsari |
| 7,383,695 B2 * | 6/2008 | Lehman et al. ............ 65/29.16 |
| 7,389,880 B2 | 6/2008 | Goldmann et al. |
| 7,449,655 B2 | 11/2008 | Cowling et al. |
| 2003/0001726 A1 | 1/2003 | Moore |
| 2003/0015461 A1 | 1/2003 | Miyamoto et al. |
| 2003/0133484 A1 | 7/2003 | Kimura et al. |
| 2004/0095571 A1 | 5/2004 | Bourely et al. |
| 2004/0133484 A1 | 7/2004 | Kreiner et al. |
| 2004/0140248 A1 | 7/2004 | Dauzvardis et al. |
| 2005/0032920 A1 | 2/2005 | Norbeck et al. |
| 2005/0035032 A1 | 2/2005 | McGee |
| 2005/0126958 A1 | 6/2005 | Bohlig et al. |
| 2006/0081513 A1 * | 4/2006 | Kenny ........................ 209/672 |
| 2006/0085212 A1 * | 4/2006 | Kenny ........................... 705/1 |
| 2007/0099038 A1 | 5/2007 | Galloway |
| 2007/0187299 A1 | 8/2007 | Valerio |
| 2008/0014112 A1 | 1/2008 | Lee et al. |
| 2008/0020456 A1 | 1/2008 | Choate et al. |
| 2008/0061124 A1 | 3/2008 | Langlois et al. |
| 2008/0061125 A1 | 3/2008 | Langlois et al. |
| 2008/0085212 A1 | 4/2008 | Adams et al. |
| 2008/0105597 A1 | 5/2008 | Miller et al. |
| 2008/0156703 A1 | 7/2008 | Kenny |
| 2008/0197056 A1 | 8/2008 | Kenny |
| 2008/0197058 A1 | 8/2008 | Kenny |
| 2009/0114571 A1 | 5/2009 | Miller et al. |

FOREIGN PATENT DOCUMENTS

| | | |
|---|---|---|
| DE | 10135678 | 2/2003 |
| EP | 0439674 | 8/1991 |
| GB | 1450940 | 9/1976 |
| GB | 1528236 | 10/1978 |
| GB | 2395887 | 6/2004 |
| GB | 2419551 | 5/2006 |
| JP | 2001-058846 | 3/2001 |
| JP | 2001-189203 | 7/2001 |
| WO | WO 03/086733 | 10/2003 |

OTHER PUBLICATIONS

Form PCT/ISA/210: International Search Report from PCT Application No. PCT/US2005/039464 dated Dec. 4, 2006.

Form PCT/ISA/237: Written Opinion from PCT Application No. PCT/US2005/039464 dated Dec. 4, 2006.

"Einsatz Von Mogensen Vibro-Stangensizer Beim Altglas-Recycling." Aufbereitungs-Technik, 33, Aug. 1, 1992 (3 pages).

Capel et al. "Waste sorting- a look at the separation and sorting techniques in today's european market." Waste Management World Magazine (Available online at http://www.wastemanagement-world.com/display_article/339838/123/CRTIS/none) Jul. 2008 (6 pages).

Duckett, E., "The Influence of Color Mixture on the Use of Glass Cullett Recovered from Municipal Solid Waste" Conservation & Recycling, vol. 3, No. 2(1979) (18 pages).

Envirosris Knowledge Innovative Solutions, "Final Report - Material Recycling Facility Technology Review - WDO Project Code OPT-R3-05," The City of Ottawa, Jul. 2001 (38 pages).

European Search Report for EP 05256769 dated Jan. 13, 2006 (2 pages).
European Search Report for European Patent Application No. 05254328.7 dated Oct. 14, 2005 (3 pages).
European Search Report for European Patent Application No. 05254327.9 dated Oct. 14, 2005 (2 pages).
eWasteTech.com News "Crisp County Build New Waste Processing Plant." (Available online at http://www.ewastetech.com/pr02.htm) Aug. 1997 (1 page).
Hendrix, et al. "Technologies for the Identification, Separation, and Recycling of Automotive Plastics." International Journal of Environmentally Conscious Design and Manufacturing Mar. 1996 (24 pages).
Lotfi, A. "Plastic Recycling," Plastic/Polymer Recycling. (Available online at http://www.lotfi.net/recycle/plastic.html) Applied Spectroscopy, Jun. 1997 (17 pages).
MEEF Plastic Recycling, "Plastic Recycling - The Problem with PVC," (Available online at http://www.engforum.com/recycling/PVC.htm) Mar. 7, 2006 (4 pages).
PCT/US05/24687 International Search Report mailed Jan. 4, 2008 (4 pages).
PCT/US05/24681 International Search Report mailed Dec. 20, 2006 (2 pages).
PCT/US08/062249 International Search Report mailed Aug. 14, 2008 (2 pages).
R.E.D. Recycling Engineering & Development Ltd. "Scrap Metal Processing, Down Stream Systems." (Available online at http://www.redltd.co.uk/scrap_metal.php4) 2009 (4 pages).
Ramasubramanian et al. "Sensor Systems for high speed intelligent sorting of waste paper in recycling," North Carolina State University (28 pages).
RRT Design & Construction. "Technologies & Products - Product Diversity." (Available online at http://web.archive.org/web/20080207032542/www.mtenviro.com) 2003 (7 pages).
Solano et al. "Life-cycle based solid waste management. I: Model Development," J. of Environmental Engineering, Oct. 2002 (12 pages).
Tim Goodman & Associates, "Materials Recovery Facilities Operational Assessment Final Report and Optimization Guide", Aug. 11, 2003 (45 pages).
TiTech, "TiTechPolySort," (Available online at http://www.titech.com/default.asp?V_ITEM_ID=484) 2006 (5 pages).
Wahab et al. "Development of a Prototype Automated Sorting System for Recycling." Amer. J. of App. Sciences. 3(7) 5 pages).
US 5,041,996, 08/1991, Emering (withdrawn)

* cited by examiner

SYSTEMS AND METHODS FOR GLASS RECYCLING AT A BENEFICIATOR AND/OR A MATERIAL RECOVERY FACILITY

RELATED APPLICATIONS

This application is a continuation-in-part of U.S. patent application Ser. No. 10/989,425, filed Nov. 17, 2004, which claims the benefit under § 119 to U.S. Application No. 60/534,688 filed Jan. 8, 2004, and to U.S. Application No. 60/520,311 filed Nov. 17, 2003, the disclosures of which are incorporated by reference herein.

FIELD OF THE INVENTION

Embodiments of the present invention provide systems and methods for recycling glass at a beneficiator and/or a material recovery facility.

BACKGROUND OF THE INVENTION

Cost-effective recycling of materials, such as glass, has become an increasingly important issue to many businesses due, for example, to ever increasing legislative mandates at the federal, state and local levels, and the associated cost of complying therewith. In a recycling process, an entity such as a beneficiator and/or a material recovery facility (MRF) can face several significant challenges, particularly with regard to color sorting and recovery of sufficiently clean glass.

A beneficiator is an entity, within an overall glass recycling system, that typically receives glass from one or more material recovery facilities (MRFs), and further sorts, cleans, and/or otherwise prepares the glass so that it can be used as a raw material, for example, in bottle production. A MRF generally serves as a drop off and gross sorting point for recycled materials so that recycled material such as glass can be transported, for example, to a beneficiator for subsequent processing.

A conventional beneficiator generally processes and cleans glass through two separate processing "lines," or stages (hereinafter lines). The lines do not have to be physically separate, but rather can be different stages or aspects of an integrated process.

The first line is used to mechanically and/or manually sort glass by color (e.g., flint, amber, green), and remove contaminants. Color sorting is necessary because conventional glassmaking techniques require that like-colored glass be recycled together. A conventional beneficiator usually processes one color of glass at a time, particularly when automated optical sorting is performed, generally due to the added cost associated with providing the equipment and/or labor that would enable two or more colors of glass to be simultaneously color sorted. If a conventional beneficiator sorts two or more colors (e.g., flint and amber) of glass, the entire glass stream must proceed through a series of color-specific optical sorters, or proceed through the line multiple times, once for each color of glass.

The second line is used to further clean, screen, and/or crush glass to achieve size uniformity. For example, the second line may be used to remove ceramics and other contaminants from the glass stream. The second line often, however, is inactive, as the line must wait for the first line to finish processing before receiving the glass stream.

Pieces of mixed color (e.g., flint, amber, green) glass smaller than about 10 centimeters in size are referred to as mixed cullet or residue (hereinafter mixed cullet). A conventional beneficiator typically amasses stockpiles of mixed cullet, which is typically used either as a landfill cover material, or is further processed, at an additional cost, so that it can be used, for example, as a paving material such as glasphalt (a highway paving material in which recovered ground glass replaces some of the gravel in asphalt) and/or aggregate (material such as glass, sand or small stones mixed with a binder such as cement to produce mortars and concrete).

The beneficiator must color sort the mixed cullet if it wants to extract a higher value therefrom. Current manual and automated sorting methods are labor intensive and costly. Moreover, color sorting of mixed cullet is generally not economically viable. The beneficiator may also blend mixed cullet into the color sorted glass, but is limited by the amount of cullet that can be blended into the separated glass because separated glass colors must generally ship with, for example, a maximum 5% color contamination. Beneficiators thus have a growing supply of mixed cullet, which surpasses available supplies of color sorted material to which it may be added. MRFs can encounter similar situations and issues.

There is a need in the art for more economically viable methods of using mixed cullet and more economically viable systems and methods for MRFs and/or beneficiators to recycle and process mixed cullet. The invention is directed to these, as well as other, important ends.

SUMMARY OF THE INVENTION

In one embodiment of the present invention, a system for recovering mixed color cullet from a supply of waste material includes a feed hopper that receives the waste material. The waste material can include ferrous material, ceramic material, and mixed color cullet that includes green glass, flint glass and amber glass. A ferrous separator removes the ferrous material, and a ceramic detector and separator removes at least a portion of the ceramic material, analyzes the composition of the remaining waste material that includes the mixed color cullet, and provides data that can be used to certify the composition of at least the mixed color cullet.

The system can also include an output hopper that receives the remaining waste material that includes mixed color cullet. The composition of at least the mixed color cullet can be certified. For example, the certification data can include a percent by weight of a quantity of each of the flint glass, the green glass and the amber glass. The certification data can include a percent by volume of a quantity of each of the flint glass, the green glass, and the amber glass.

The system may also include one or more apparatus selected from the group consisting of a non-ferrous separator, an air classifier, an optical sorter, a washing station, a shaker-feeder station, and a drying station. A material recovery facility may supple the waste material.

In another embodiment of the present invention, a method for obtaining mixed color cullet from a supply of waste material includes receiving the waste material that includes ferrous material, ceramic material, and mixed color cullet that includes green glass, flint glass and amber glass. At least a portion of the ferrous material and the ceramic material are removed, and the mixed color cullet is sorted to provide a second mixed color cullet that includes: (i) about 40% to about 90% by weight flint glass, (ii) about 5% to about 40% by weight amber glass, and (iii) about 1% to about 50% by weight green glass. Data is provided that can be used to certify the composition of the second mixed color cullet. Using the data, the composition of the second mixed color cullet can be certified.

A ferrous separator can be used to remove the ferrous material. A ceramic detector and separator can be used to: (i)

remove at least a portion of the ceramic material, (ii) analyze the composition of the remaining waste material, and (iii) provide the data that can be used to certify the composition of the second mixed color cullet. An optical sorter may provide the data used to certify the composition of the second mixed color cullet. An optical sorter can also provide data that includes a percent by weight of a quantity of the flint glass, the green glass and the amber glass. The optical sorter can also provide data that includes a percent by volume of a quantity of the flint glass, the green glass and the amber glass.

Another method in accordance with the present invention for producing mixed color cullet includes receiving a supply of waste material that includes contaminants and a supply of first mixed color cullet that includes green glass, amber glass and flint glass. At least a portion of the contaminants are separated from the first mixed color cullet. The first mixed color cullet is added in an amount greater than 5% by weight to a single color glass stream to produce a second mixed color cullet. Data is provided that can be used to certify the composition of the second mixed color cullet. Using the data, the composition of the second mixed color cullet can be certified.

The data may include a percent by weight of a quantity of each of the flint glass, the green glass and the amber glass. The data may include a percent by volume of a quantity of each of the flint glass, the green glass, and the amber glass.

These and other aspects of the invention are described in more detail herein.

FIGURES

DETAILED DESCRIPTION OF THE INVENTION

The inventors have determined that it would be advantageous to simplify the glass sorting and cleaning process that can be used by a beneficiator and/or a material recovery facility (MRF). It would be advantageous to enable a beneficiator and/or a MRF to recycle glass without having to sort the glass by color. It would be also advantageous to enable a beneficiator and/or a MRF to process mixed cullet as well as single-colored glass. In addition, it would be advantageous to enable a beneficiator and/or a MRF to combine increasing quantities of mixed cullet with a color sorted glass stream. It would be advantageous to enable a beneficiator and/or a MRF to directly or indirectly supply glass plants with cullet that can be used in conjunction with, for example, the de-coloring/coloring technology described in U.S. Pat. Nos. 5,718,737 and 6,230,521, the disclosures of which are incorporated by reference in their entirety.

Figure 1:
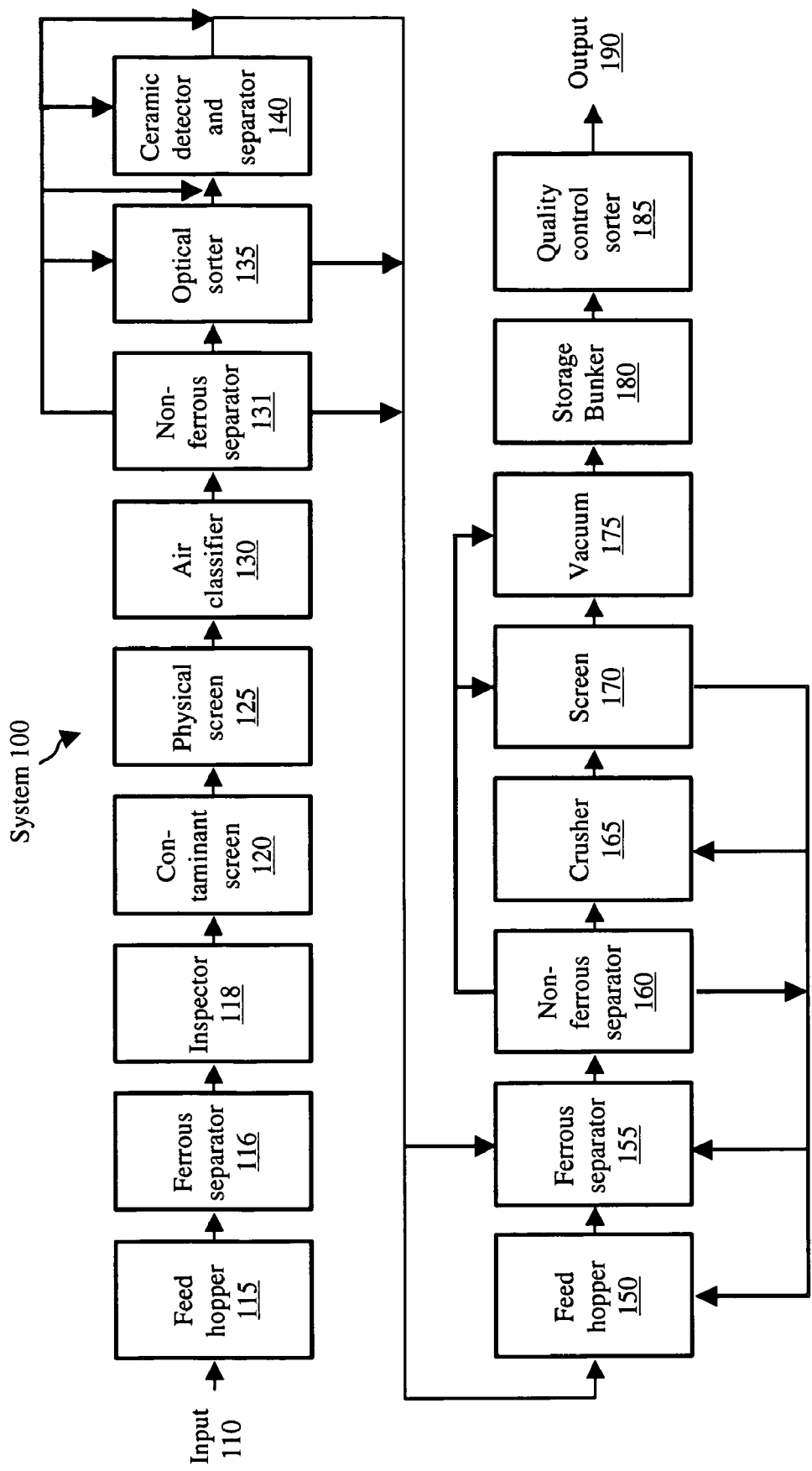
FIG. 1 is a block diagram of an exemplary glass recycling system of the invention that can process glass of mixed color and size.

FIG. 1, generally at 100, illustrates a block diagram of an embodiment of an exemplary glass recycling system in accordance with the invention. The recycling system 100 can be implemented, for example, at a beneficiator and/or a MRF. The method of FIG. 1 utilizes the following sequential, non-sequential, or sequence independent steps for processing waste material that is input 110 into the system 100. The method described in FIG. 1 is exemplary, and may performed in different orders and/or sequences as dictated or permitted by system 100, and any alternative embodiments thereof. In addition, the method described herein is not limited to the specific use of system 100, but may be performed using any system that is capable of obtaining the material(s) as described in connection with system 100.

System 100 can include a feed hopper 115, a ferrous separator 116, an inspector 118, a contaminant screen 120, a physical screen 125, which may have or otherwise utilize a crusher, an air classifier 130, a non-ferrous separator 131, an optical sorter 135, and/or a ceramic detector and separator 140. System 100 can also include a second feed hopper 150, a second ferrous separator 155, a second non-ferrous separator 160, a crusher 165, a screen 170, a vacuum 175, a storage bunker 180, and/or a quality control sorter 185. In addition, there is a stream or source of input 110. Output 190 is generally glass (e.g., mixed cullet) that can be provided to a glass plant which can use the output 190 to make products, such as glass bottles. One or more conveyor systems are generally used to transport input 110 between at least some of the equipment described above. Numerous arrangements of the various equipment can be used. In addition, not all equipment described herein need be used in all embodiments.

Input or waste material 110 generally includes mixed color (e.g., flint, green, and/or amber) glass bottles, either whole or broken, of varying sizes and shapes, that are mixed in with contaminants such as paper, plastics, aluminum, metals, ceramics, and the like. More particularly, input 110 may also include contaminants such as dishware, heat-resistant glass, porcelain, mirror glass, light bulbs, plate glass, concrete, stones, dirt, metal, plastic lids and/or plastic lid rings. Input 110 may include glass article rejects produced by a glass plant; off-specification glass articles produced by a glass plant, and/or glass article overruns produced by a glass plant. Input 110 may come from a variety of sources, such as companies providing services for state mandated bottle bills, bottlers' plant scrap and/or haulers handling material generated at commercial establishments such as restaurants.

Feed hopper 115 is a standard industrial hopper that receives input or waste material 110 and "feeds" input 110 to a conveyor belt or line. For example, model D-20 manufactured by ABCO Engineering Corp., Oelwein, Iowa may be used. Input 110 then passes under a standard magnetic or electromagnetic separator, such as ferrous separator 116, which removes ferrous material from the remainder of input 110. Ferrous separator 116 may utilize a magnetic belt separator that moves like a conveyor belt, carrying input 110 to a stripper magnet for controlled discharge. In one embodiment, a stainless steel section on existing conveyor installations may be used for maximum magnet effectiveness. A ferrous separator such as manufactured by Eriez Magnetics, Erie, Pa., may be used.

Inspector 118 is a human inspector who sorts through input 110 and removes large pieces of contaminants therefrom. Contaminant screen 120, physical screen 125, ceramic detector and separator 140, and screen 170 are standard, automated screening mechanisms such as disc screens, vibratory deck screens, and trommels that are configured to mechanically separate specific contaminants (e.g., plastic and metal material) from the glass within input 110.

The main design concept and operating principle of a screen is to remove recyclables negatively from input 110. This reduces the need for labor-intensive removal by positively picking the material from input 110, though one or more manual sorters may be utilized to further inspect the material and remove miscellaneous contaminants. A trommel is a rotating cylindrical screen that is inclined at a downward angle with the respect to the horizontal. Material is fed into the trommel at the elevated end, and the separation occurs while the material moves down the drum. The tumbling action of the trommel effectively separates materials that may be attached to each other.

In particular, contaminant screen 120 further screens for contaminants that exceed a predetermined size and that were not removed by inspector 118. Contaminant screen may be a disk screen manufactured by Bulk Handling Systems, Eugene, Oreg. However, other types of screens, such as a vibratory deck screen, may also be used. Contaminant screen and/or the size of the screen that is to be used with contaminant screen 120 can be selected to accommodate the predetermined size. Before contaminant screen 120, a crusher (not shown) may be used to allow glass to be sized reduced and fall through screen 120, while other items that do not crush, such as plastic and aluminum containers, will retain their shape and be screened out.

Input 110 proceeds to physical screen 125, which screens out pieces of glass smaller than, for example, approximately 1 centimeter in size because pieces of this size are typically contaminated with ceramics that cannot be detected efficiently by known optical sorters. Physical screen 125 can be a vibrating screen, such as manufactured by General Kinematics Corp, Barrington, Ill. Removal of ceramics from input 110 is desirable because ceramic impurities remaining in the glass stream may adversely affect the glass recycling and manufacturing process, as well as the structural integrity of the finished glass product.

Input 110 then proceeds through a standard air classifier 130, which blows or vacuums away items such as loose paper, labels and plastics from input 110. An air classifier is a device that uses a moving stream of air to separate light waste components (paper, plastic film, textiles, dust, leaves, foil, etc.) from heavy components (glass, metal, wood, bulk plastic, etc.). An air classifier such as manufactured by CP Manufacturing, National City, Calif., may be used.

Non-ferrous separators 131 and 160 are standard separators, such as an eddy-current separator, that separate out items such as aluminum cans and rings, and/or brass, copper, magnesium, and zinc items from the remainder of input 110. An eddy-current separator works through the principle of high-frequency oscillatory magnetic fields, which induce an electric current in a conductive object such as an aluminum can. The oscillating fields can be adjusted to optimize separation. This electric current generates a magnetic field, which causes the object to be repelled away from the primary magnetic field. Conductive particles can be fed either directly into the non-ferrous separator's 131, 160 rotating drum, or onto a belt enveloping the drum. In one or more embodiments of the invention, one or more inspectors 118 may be used in lieu of non-ferrous separator 131 to remove non-ferrous material.

Optical sorter 135 is a standard optical sorting system typically used in conventional beneficiator recycling plants to optically detect and sort glass within input 110 by color. An optical sorter manufactured by Bender & Co. (Austria), represented in the U.S. by Tomen America (Charlotte, N.C.), may be used. The Glass ColorSort™ System manufactured by Magnetic Separation Systems, Nashville, Tenn. may also be used. However, in system 100, even if optical sorter 135 is present, the use of optical sorter 135 is optional. If optical sorter 135 is not present in system 100, input 110 can proceed from non-ferrous separator 131 to ceramic detector and separator 150, feed hopper 150, or ferrous separator 150, depending on the configuration and/or operational configuration of system 100. If optical sorter 135 is present in system 100, switching optical sorter 135 off may increase the speed at which input 110 can be processed by system 100. In another embodiment, optical sorter 135 can advantageously be used to sort out ceramics if it is not used to color sort the glass in input 110. In yet another embodiment, optical sorter 135 can be used to image and sort input 110 as in a conventional system. For example, multiple optical sorters (not shown) can be provided that respectively sort a particular glass color. The glass colors can be diverted into various lines for processing. In still another embodiment, input 110 can be processed by optical sorter 135 multiple times, with optical sorter 135 selecting a particular color of glass for each run.

Optical sorter 135 may be utilized to certify data that can be provided to a third party. For example, if optical sorter 135 is used to sort out ceramics, system 100 can be used to certify the composition of the ceramic removed from input 110, and provide the composition certification, for example, to a broker and/or a paper recycler. The composition may include, for example, a percent (by units, weight and/or volume) of ceramic removed. Optical sorter 135 may facilitate certification by providing the number of units of ceramic pieces detected, along with volume (e.g., average volume/unit) and/or weight (e.g., average weight/unit) data associated with ceramic pieces that are a part of input 110. Short term and/or long tem empirical data pertaining to the composition of an input stream of recyclables of a particular system 700 can be used to facilitate calculation of volumes, weights and/or averages.

Similarly, an operator of system 100, can utilize optical sorter 135 to certify the composition of processed cullet, and provide the composition certification, for example, to a broker and/or beneficiator. The composition may include, for example, a percent (by weight and/or volume) of flint, green and/or amber cullet, a percent (by weight and/or volume) of organic impurities, a percent (by weight and/or volume) of inorganic impurities, a percent (by weight and/or volume) of ferrous impurities, and/or a percent (by weight and/or volume) of non-ferrous impurities. Certification data may also be provided with regard to nominal and/or average cullet size. Short term and/or long tem empirical data pertaining to the glass composition of an input stream of recyclables of a particular system 700 can be used to facilitate calculation of volumes, weights and/or averages. Because the invention may process mixed cullet for a glass plant that does not need to process color sorted glass, system 100 does not need to sort glass by color. Moreover, input 110 can advantageously be processed using a single processing line so that different glass colors do not have to be placed on separate lines. Regardless of whether glass within input 110 is separated by color or remains mixed together, the glass can be processed in the same manner by various configurations and/or operational configurations of feed hopper 150, ferrous separator 155, non-ferrous separator 160, crusher 165, screen 170, vacuum 175, storage bunker 180, and/or quality control sorter 185, as described herein.

Ceramic detector and separator 140 can receive input 110 from non-ferrous separator 131, or optical sorter (if used). Ceramic detector and separator 140 can be a standard ceramic remover that extracts ceramic contaminants from glass pieces that are about 1.3 centimeters to about 6.4 centimeters in size. Input 110 may be fed into ceramic detector and separator 140 by a vibrating conveyer belt, which keeps the material in a thin layer. In one embodiment, input 110 enters ceramic detector and separator 140, the glass passes over a plate embedded with fiber optic cables. A pulsing light (usually visible light) is projected through the glass to the fiber optic cables, which detect the position of any opaque material. Ceramic detector and separator 140 then directs one of a series of "air knives" to remove the ceramic material with a burst of air. The Glass ColorSort™, by MSS Inc, Nashville, Tenn. (purchased by CP Manufacturing, National City, Calif.), can be used as an integrated unit that performs the functions of optical sorter 135 and ceramic detector and separator 140.

A crusher, such as described above in connection with contaminant screen 120, may be used to reduce glass to a predetermined size, since ceramic detector and separator 140 operates more efficiently when processing pieces of glass ranging in size from, for example, about 1 centimeter to about 7 centimeters in size; or from about 1.3 centimeters to about 6.4 centimeters in size.

Feed hopper 150 receives input 110 from non-ferrous separator 131, optical sorter 135 or ceramic detector and separator 140, depending on the configuration used, as described above. Alternatively, if feed hopper 150 is not utilized, input 110 can proceed from non-ferrous separator 131, optical sorter 135 or ceramic detector and separator to ferrous separator 155.

Input 110 proceeds to ferrous separator 155, which can be a separator as described above with regard to ferrous separator 116. Ferrous separator 155 extracts any remaining ferrous material from the stream with industrial magnets. The stream then passes through non-ferrous separator 160, which removes any remaining non-ferrous metals such as lids, rings, and cans. Non-ferrous separator 160 can be a separator as described above with regard to non-ferrous separator 131. In an alternate embodiment, ferrous separator 155 and/or non-ferrous separator 160 can be eliminated if ferrous separator 116 and/or non-ferrous separator 131, respectively, clean input 110 to the desired level.

In addition to or in lieu of non-ferrous separator 160, a non-ferrous optical sorter such as the Aladdin™ model from Magnetic Separation Systems Inc., Nashville, Tenn., may be used. In this embodiment, the optical sorter may my used to certify data that can be provided to a third party. For example, the optical sorter may be used in conjunction with optical sorter 135 to determine an amount of ceramic that is removed from input 110. System 100 can be used to certify the composition of the ceramic removed from input 110, and provide the composition certification, for example, to a broker and/or a paper recycler. The composition may include, for example, a percent (by units, weight and/or volume) of ceramic removed. The optical sorter may also facilitate certification by providing the number of units of ceramic pieces detected, along with volume (e.g., average volume/unit) and/or weight (e.g., average weight/unit) data associated with ceramic pieces that are a part of input 110. Short term and/or long tem empirical data pertaining to the composition of an input stream of recyclables of a particular system 700 can be used to facilitate calculation of volumes, weights and/or averages.

Similarly, an operator of system 100, can utilize the optical sorter to certify the composition of processed cullet, and provide the composition certification, for example, to a broker and/or beneficiator. The composition may include, for example, a percent (by weight and/or volume) of flint, green and/or amber cullet, a percent (by weight and/or volume) of organic impurities, a percent (by weight and/or volume) of inorganic impurities, a percent (by weight and/or volume) of ferrous impurities, and/or a percent (by weight and/or volume) of non-ferrous impurities. Certification data may also be provided with regard to nominal and/or average cullet size. Short term and/or long tem empirical data pertaining to the glass composition of an input stream of recyclables of a particular system 700 can be used to facilitate calculation of volumes, weights and/or averages. If an optical sorter is used in lieu of non-ferrous separator 160, optical sorter may then not be used or, if used, may not be used to provide data in connection with certification data. Crusher 165 is a standard crushing unit that crushes or smashes glass to a predetermined size for further processing or handling. For example, model HMG-40, manufactured by C.S. Bell Co., Tiffin Ohio, may be utilized. Crushed glass may also enable system 100 to process input at an increased throughput rate. Pieces of glass greater than about 1.6 centimeters are then optionally screened out by screen 170, and returned to crusher 165 for further crushing before traveling to vacuum 175, which removes or substantially removes debris and other contaminants, such as labels, bits of paper, plastics and/or other contaminants. Screen 170 may be a standard finger screen.

In another embodiment of the invention, if crusher 165 and screen 170 are not used, pieces of glass having a size equal to or smaller than 1.6 centimeters proceed from non-ferrous separator 160 to vacuum 175, and pieces larger than about 1.6 centimeters proceed from non-ferrous separator 160 to feed hopper 150 if used, or alternatively to ferrous separator 155. The pieces larger than about 2 centimeters, about 1.6 centimeters or about 1 centimeter will generally be broken into smaller pieces when circulated back to feed hopper 150 or ferrous separator 155. In yet another embodiment of the invention, if the glass is not crushed, input 110 can proceed from non-ferrous separator 160 to vacuum 175.

In one embodiment, a washing station can be used. The washing station is typically a closed-loop system with multiple screens, operating optimally in the range of about 150° F. to about 170° F. The temperature should be at least 130° F. Additionally, some type of detergent may be used. Typically, a 1% caustic solution such as sodium hydroxide will be ideal. During the washing stage, vibrating water action agitates the glass and thereby loosens solid debris such as label glue, paper fiber and food. Filters are used to keep the circulating water clean and also to remove fine dust and debris. After a thorough washing process, the glass is then rinsed in a monolayer with clean water.

After the washing stage, the glass may be transported by a vibrating conveyer through a shaker-feeder station where a vibrating perforated deck removes bulk moisture from the glass. The purpose of the shaker-feeder station is simply to remove bulk moisture from the glass before subjected to forced hot air during the subsequent drying stage. The shaker-feeder significantly increases the efficiency of the subsequent drying station.

The washed glass from the shaker-feeder station may be further dried by going through a drying station. Typically, the drying station may be a vibrating, forced hot air, fluidized bed using a gas or oil fired heat source. As an example, a 1.5 MBTU gas-fired heat source would be sufficient for this process. The fluid bed dryer which has a perforated stainless steel deck, operates optimally with a supply of forced air from about 180° F. to about 200° F. which should maintain operating temperature of the dryer from about 140° F. to 180° F. After the glass passes through the drying station, the glass is substantially dry with about 0.25% maximum moisture content.

Input 110 is then discharged from vacuum 175 into storage bunker 180, which is a standard storage bin or any holding apparatus, where quality control sorter 185 (e.g., a human sorter) removes any remaining contaminants. At output 190, the cleaned glass may be shipped to an entity such as a bottle manufacturer for use in bottle production. Thus, embodiments of the invention advantageously provide, for example, MRFs and/or beneficiators with enhanced processing capabilities, particularly since system 100 provides the option of whether or not to color sort. MRFs and/or beneficiators will no longer be required to color sort mixed cullet, and will no longer need to dilute glass separated by color with mixed cullet in order to realize significant value from the mixed cullet.

Figure 2:
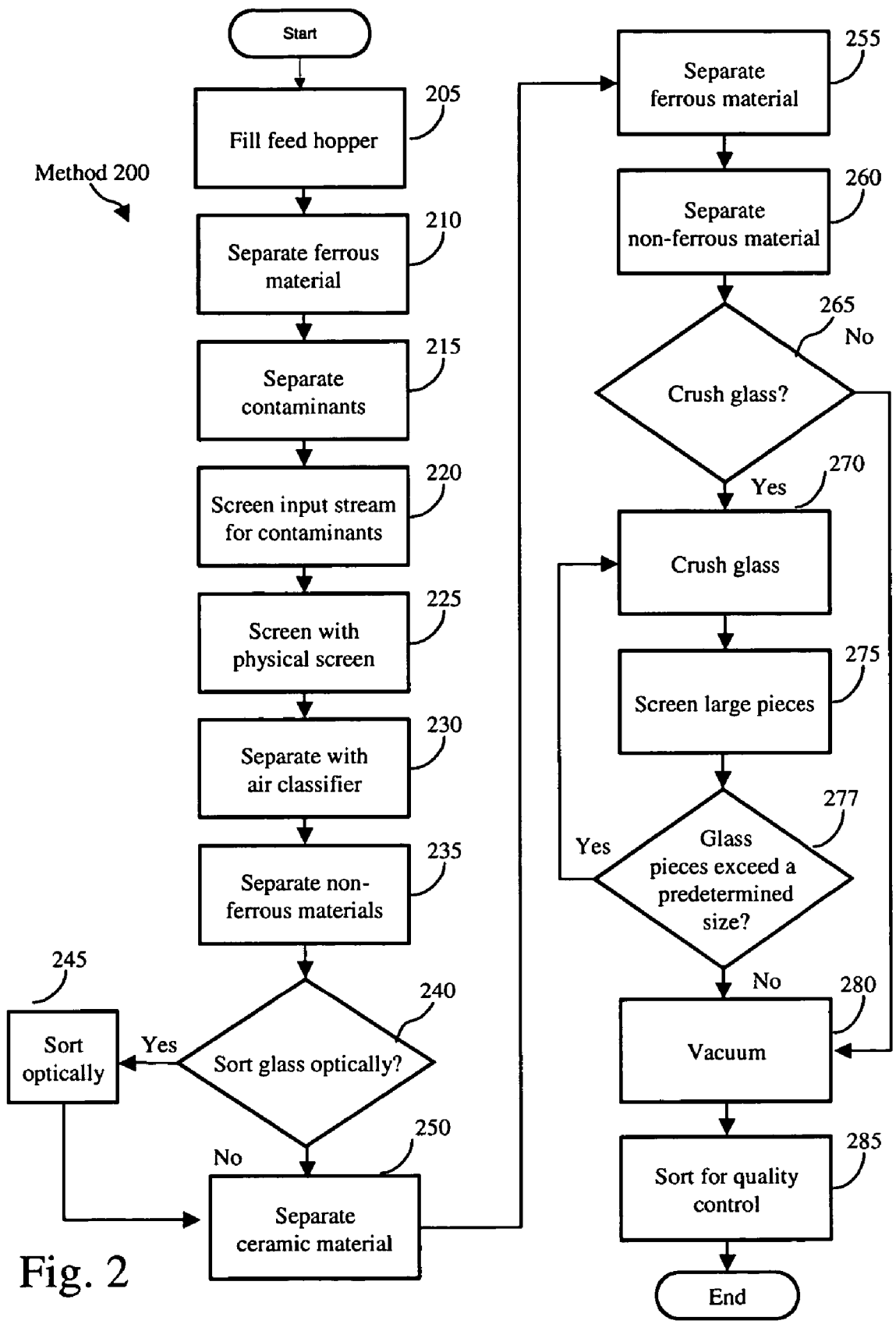
FIG. 2 is a flow diagram illustrating an exemplary method of the invention for preparing recycled glass for use at a glass plant.

FIG. 2, generally at 200, illustrates an exemplary method 200 of recycling mixed colored glass supplied, for example, to a MRF and/or a beneficiator glass recycling system 100. The method of FIG. 2 utilizes the following sequential, non-sequential, or sequence independent steps for processing mixed colored glass using, for example, system 100. The method described in FIG. 2 is exemplary, and may performed in different orders and/or sequences as dictated or permitted by system 100, and any alternative embodiments thereof. In addition, the method described herein is not limited to the specific use of system 100, but may be performed using any system that is capable of obtaining the material(s) as described in connection with system 100.

At step 205, input 110 is fed into feed hopper 115. At step 210, ferrous material separator 116 extracts ferrous material from input 110. At step 215, inspector 118 removes contaminants from input 110.

At step 220, input 110 proceeds to contaminant screen 120, which removes or substantially removes contaminants exceeding a predetermined size that have been transported beyond inspector 118. At step 225, physical screen 125 screens out pieces of glass smaller than, for example, about 1 centimeter in size, which are likely to be contaminated with ceramic.

At step 230, air classifier 130 uses currents of air to further remove contaminants, such as bits of paper, labels, and plastics from input 110. At step 235, non-ferrous separator 131 removes non-ferrous materials, such as aluminum containers, from input 110. A human inspector may be used in lieu of non-ferrous separator 131.

At decision step 240, if an optical sorter is used to process input 110, optical sorter 135 performs an optical sort at step 245. When glass is color sorted, multiple optical color sorters 135 may be used to divert glass of a particular color to respective separate conveyor belts within system 100. In another embodiment, optical sorter 135 can also be adjusted to detect various glass colors. Input 110 can pass through optical sorter 135 multiple times so that optical sorter 135 will detect and separate the desired glass color. If optical sorter 135 is not used, at step 250 input 110 can proceed to ceramic detector and separator 140, if used. When glass in input 110 is not color sorted, system 100 can generally process input 110 at a higher throughput.

Feed hopper 150 may optionally be used to receive input 110 from non-ferrous separator 131, optical sorter 135 or ceramic detector and separator 140, depending on the configuration and/or operational configuration of system 100, as described above. If input 110 can proceed directly from non-ferrous separator 131, optical sorter 135 or ceramic detector and separator 140 to ferrous separator 155, then feed hopper 150 need not be utilized, even if present within system 100. If feed hopper 150 is utilized, then at step 255 input 110 proceeds from feed hopper 150 to ferrous separator 155, which is used to further extract metal material from input 110. If feed hopper 150 is not utilized, then input 110 can proceed directly from non-ferrous separator 131, optical sorter 135 or ceramic detector and separator 140 to ferrous separator 155.

At step 260, non-ferrous separator 160 is used to further separate non-ferrous metals, such as aluminum rings and tabs, from input 110. At decision step 265, a determination is made whether to crush glass within input 110. If at decision step 265 it is determined that the glass is to be crushed, in one embodiment, crusher 165 may be used to crush the glass at step 270. At step 275, the crushed glass within input 110 proceeds to screen 170. At decision step 277, a determination is made whether any pieces of the glass within input 110 exceed a predetermined size. If there are pieces of glass smaller than or equal to a predetermined size of, for example, about 1.6 centimeters, at step 280 the smaller glass pieces proceed to vacuum 175. Pieces of glass having a size greater than about 1.6 centimeters are returned to crusher 165 for further crushing. At step 285, quality control sorter performs a final quality inspection of input 110, and removes and final contaminants.

In another embodiment, if it is determined at decision step 265 that glass is to be crushed and crusher 165 is not utilized, at step 270 input 110 can proceed from non-ferrous separator 160 to screen 170, from which pieces of glass smaller than or equal to, for example, about 1.6 centimeters proceed to vacuum 175 at step 280. Pieces of glass having a size greater than about 1.6 centimeters are returned to feed hopper 150 (if used), or to ferrous separator 155 if feed hopper 150 is not used. One or more iterations of transporting input 110 from screen 170 to feed hopper 150 or ferrous separator 155 will further break all or a vast majority of glass down to the desired size.

If at decision step 265 it is determined that glass will not be crushed, at step 280 glass within input 110 proceeds to vacuum 175. At step 285, quality control sorter performs a final quality inspection of input 110, and removes any remaining contaminants. Output 190 is glass that can be shipped to a glass plant for use in a recycling process.

As discussed herein, system 100 can process and clean glass through two separate processing lines. The lines can be physically separate or they can be partially or totally integrated. In another embodiment of the invention, the first line is used to mechanically and/or manually sort glass by color (e.g., flint, amber, or green) and to remove contaminants. Thereafter, the second or another line is used to mechanically or manually add mixed cullet to the single color cullet and, optionally, to remove contaminants and/or to further clean, screen, and/or crush the cullet to achieve size uniformity. For example, mixed cullet can be added to flint glass; mixed cullet can be added to amber glass; or mixed cullet can be added to green glass. The mixed cullet can be added to the single color cullets in amounts up to about 75% by weight; up to about 50% by weight; up to about 25% by weight; or up to about 10% by weight. When mixed cullet is added to the single color cullet, the mixed cullet generally comprises from about 45% to about 90% by weight flint, about 5% to about 35% by weight amber and from 0 to about 30% by weight green; or from about 50% to about 80% by weight flint, about 10% to about 30% by weight amber and from about 5% to about 25% by weight green. After the single color cullet is combined with the mixed cullet, the resulting product can be used by a glass manufacturer.

Because system 100 in accordance with various embodiments of the present invention enables, for example, a MRF and/or a beneficiator to combine single color cullet with mixed cullet, a MRF and/or a beneficiator utilizing any of the various embodiments of system 100 can be paid to take stockpiles of mixed cullet from, for example, conventional beneficiators (e.g., beneficiators who do not utilize system 100 or embodiments thereof) who typically have to pay to have their stockpiles of mixed cullet removed from their facilities for use in glasphalt or aggregate. Thus, embodiments of the present invention provide an alternative use for the mixed cullet that is generated by, for example, conventional beneficiators.

Although the invention has been set forth in detail, one skilled in the art will appreciate that numerous changes and modifications can be made to the invention, and that such changes and modifications can be made without departing from the spirit and scope of the invention.

What is claimed is:

1. A method for obtaining mixed color cullet from a supply of waste material comprising:
   receiving the waste material comprising ferrous material, ceramic material, and mixed color cullet comprising green glass, flint glass and amber glass;
   utilizing a first optical sorter to determine the characteristics of the received waste material;
   removing at least a portion of the ferrous material and the ceramic material;
   sorting the mixed color cullet to provide a second mixed color cullet comprising: (i) about 40% to about 90% by weight flint glass, (ii) about 5% to about 40% by weight amber glass, and (iii) about 1% to about 50% by weight green glass;
   utilizing a second optical sorter in communication with the first optical sorter to compare the characteristics of the sorted mixed color cullet to determine at least one of the amount of ferrous and non-ferrous materials that has been removed from the received waste material; and
   providing data that can be used to certify the composition of the second mixed color cullet.

2. The method of claim 1, further comprising certifying the composition of the second mixed color cullet.

3. The method of claim 1, wherein a ferrous separator removes the ferrous material.

4. The method of claim 1, wherein a ceramic detector and separator is used for: (i) removing at least a portion of the ceramic material, (ii) analyzing the composition of the remaining waste material, and (iii) providing the data that can be used to certify the composition of the second mixed color cullet.

5. The method of claim 1, wherein at least one of the optical sorters provides the data used to certify the composition of the second mixed color cullet.

6. The method of claim 5, wherein the optical sorters provides data comprising a percent by weight of a quantity of the flint glass, the green glass and the amber glass.

7. The Method of claim 5, wherein the optical sorters provides data comprising a percent by volume of a quantity of the flint glass, the green glass and the amber glass.

8. The method of claim 1, wherein the second optical sorter is positioned downstream from at least one of the ferrous separator and the ceramic detector.

* * * * *